(12) United States Patent
Sugitate (10) Patent No.: US 12,454,337 B2
(45) Date of Patent: Oct. 28, 2025

(54) MARINE VESSEL

(71) Applicant: HONDA MOTOR CO., LTD., Tokyo (JP)

(72) Inventor: Kenta Sugitate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 571 days.

(21) Appl. No.: 17/901,883

(22) Filed: Sep. 2, 2022

(65) Prior Publication Data

US 2024/0076016 A1 Mar. 7, 2024

(51) Int. Cl.
| | |
|---|---|
| *B63B 43/06* | (2006.01) |
| *B63B 13/00* | (2006.01) |
| *B63B 79/10* | (2020.01) |
| *B63J 3/00* | (2006.01) |

(52) U.S. Cl.
CPC ............. *B63B 43/06* (2013.01); *B63B 79/10* (2020.01); *B63B 2013/005* (2013.01); *B63B 2207/02* (2013.01); *B63J 2003/002* (2013.01)

(58) Field of Classification Search
CPC ... B63B 43/06; B63B 79/10; B63B 2013/005; B63B 2207/02; B63J 2003/002; B63H 21/17
See application file for complete search history.

(56) References Cited

U.S. PATENT DOCUMENTS

2022/0081090 A1* 3/2022 Watanabe ............... H02J 7/345

FOREIGN PATENT DOCUMENTS

| CN | 106865381 A | * | 6/2017 | |
|---|---|---|---|---|
| JP | 2017-218016 | | 12/2017 | |
| WO | WO-2014184231 A1 | * | 11/2014 | ............ B63C 9/03 |

* cited by examiner

*Primary Examiner* — Stephen P Avila
(74) *Attorney, Agent, or Firm* — Amin, Turocy & Watson, LLP (57) ABSTRACT

A marine vessel (10) includes: a hull (11); an electric propulsion portion (15) that propels the hull (11); a water tank portion (20) that is provided on the hull (11) and is capable of storing water in the water tank portion; a float portion (40) that is provided within the water tank portion (20) so as to be movable upward and downward; and a battery case (30) that is attached to the float portion (40) and is capable of storing a detachable portable battery (35) which becomes an electric power source of the electric propulsion portion (15) in the battery case.

10 Claims, 4 Drawing Sheets

MARINE VESSEL

BACKGROUND OF THE INVENTION

Field of the Invention

The present invention relates to a marine vessel.

Background Art

In recent years, research and development have been carried out regarding a secondary battery that contributes to the improvement of energy efficiency such that more people can ensure access to affordable, reliable, sustainable, and advanced energy.

Further, recently, efforts of providing access to a sustainable transportation system that also considers vulnerable people such as aged people or children among traffic participants are becoming active. To realize this, research and development of further improving safety or convenience of traffic are being focused on through development relating to a marine vessel.

A marine vessel propulsion system and a marine vessel electric power supply system are known which supply electric power to a marine vessel propulsion apparatus including an electric motor.

Patent Document 1 (Japanese Unexamined Patent Application, First Publication No. 2017-218016) discloses a marine vessel that includes a marine vessel propulsion machine including an engine and an electric motor. A propeller is provided on the marine vessel propulsion machine. Both the engine and the electric motor are constituted so as to generate power that rotates the propeller. Further, the marine vessel includes a starter motor and a battery that supplies electric power to the starter motor.

The starter motor is constituted so as to start the engine using electric power from a first battery. The electric motor is constituted so as to rotate the propeller using electric power from a second battery. Further, while not clearly described in the Patent Document 1 described above, in general, in order to secure reliable driving of the propeller, in addition to the first battery and the second battery for driving the propeller, the marine vessel including the marine vessel propulsion machine separately includes a third battery that supplies electric power to another device in the marine vessel.

SUMMARY OF THE INVENTION

However, the related art described above does not disclose where the battery is arranged in the vessel. Further, it is not disclosed that the battery is removable and rechargeable.

In a marine vessel, an impact on a hull during navigation or the like is large compared to a land travel vehicle or the like. Therefore, since an impact on the battery which weighs at least several kilograms or dozens of kilograms also becomes large, there is a request for dealing with this.

Further, in the marine vessel, there is also a different request on a weight balance on water, that is, stability, compared to the land travel vehicle or the like, a battery load position on the hull also needs to be considered, and there is room for improvement in the related art.

In view of the circumstances described above, the present invention is intended to achieve the purpose of providing a marine vessel capable of mitigating an impact on a battery and improving weight balance stability. Further, the present invention contributes to the improvement of energy efficiency. Further, the present invention contributes to the development of a sustainable transportation system.

(a) A marine vessel (10) according to an aspect of the present invention includes:
a hull (11);
an electric propulsion portion (15) that propels the hull (11);
a water tank portion (20) that is provided on the hull (11) and is capable of storing water in the water tank portion;
a float portion (40) that is provided within the water tank portion (20) so as to be movable upward and downward; and
a battery case (30) that is attached to the float portion (40) and is capable of storing a detachable portable battery (35) which becomes an electric power source of the electric propulsion portion (15) in the battery case.

(b) The marine vessel (10) of the aspect described above can include a cable (38) that connects the battery case (30) to the electric propulsion portion (15).

(c) In the marine vessel (10) of the aspect described above, the battery case (30) can be capable of hermetically storing a plurality of detachable portable batteries (35).

(d) The marine vessel (10) of the aspect described above can include, within the water tank portion (20), a vertical motion regulation portion (50) that regulates a movement of the float portion (40) in an upward-downward direction.

(e) In the marine vessel (10) of the aspect described above, the water tank portion (20) can include a supply discharge portion (22) that takes water in and out between an inside of the water tank portion (20) and an outside of the hull (11).

(f) In the marine vessel (10) of the aspect described above, in the water tank portion (20), a height position of the battery case (30) in the water tank portion (20) can be adjusted by adjusting an amount of seawater that is stored by the supply discharge portion (22).

(g) The marine vessel (10) of the aspect described above can include: a sensor (71) that detects the amount of seawater that is stored in the water tank portion (20); and a control portion (70) that controls the supply discharge portion (22) based on a detection result from the sensor (71) and adjusts the amount of seawater that is stored in the water tank portion (20).

(h) In the marine vessel (10) of the aspect described above, the water tank portion (20) can include a lid portion (26) that is capable of opening and closing an opening portion (25) which opens at a deck (12) of the hull (11).

(i) The marine vessel (10) of the aspect described above can include: a water tank portion (20) that includes the battery case (30) in the water tank portion; and a water tank portion (20) that does not include the battery case (30).

(j) In the marine vessel (10) of the aspect described above, the battery case (30) can be detachable from the water tank portion (20).

According to the marine vessel (a) described above, even when a large impact is applied to the hull due to waves or the like, by storing the detachable portable battery in the battery case and holding the battery case within the water tank portion in a floating state in the water stored in the water tank portion by the float portion, it is possible to enhance an impact protection property for the detachable portable battery and decrease the impact due to waves.

Further, when the water tank portion is arranged in the vicinity of the middle of the hull, since the middle portion of the hull becomes heavy by the weight of the detachable portable battery, it is also possible to improve a static stability of the hull.

According to the marine vessel (b) described above, the detachable portable battery which is held in the water tank portion in a floating state and for which the impact of waves or the like is reduced can be connected to the electric propulsion portion by the cable and be capable of being charged and discharged. Thereby, the detachable portable battery that is held in the water tank portion can be used as an electric power source of the electric propulsion portion.

According to the marine vessel (c) described above, since the number of detachable portable batteries stored in the battery case can be increased, a cruising distance as a marine vessel can be increased. Further, it is possible to replace a detachable portable battery that is used as an electric power source of the electric propulsion portion and has a decreased charge amount with a detachable portable battery stored in the battery case and accommodate the decrease of the necessary electric power.

According to the marine vessel (d) described above, the battery case that stores the detachable portable battery is supported by the float portion of which the movement in the upward-downward direction is regulated by the vertical motion regulation portion, and thereby, even when the hull is significantly shaken by waves or the like, the float portion can follow the shake of the hull and move upward and downward in a floating state with respect to the water that is shaken in the water tank portion. Thereby, the battery case does not move in a direction that intersects the upward-downward direction in the water tank portion and does not hit the surrounding water tank portion. Accordingly, it is possible to enhance an impact protection property for the detachable portable battery and decrease the impact due to waves.

According to the marine vessel (e) described above, by opening and closing the supply discharge portion, it becomes possible to arbitrarily take the water outside the vessel in and out with respect to the water tank portion. Therefore, even when a buoyancy force for the battery case is required or even when an aquatic organism such as an outcome of fishing is put in the water tank portion, it is possible to appropriately adjust the water level stored in the water tank portion and sufficiently cope with each situation.

According to the marine vessel (f) described above, by adjusting the amount of seawater stored in the water tank portion and controlling the height of the water surface in the water tank portion, in response to the shake of the hull or the like, the height position in the water tank of the battery case that floats in a floating state is controlled, and it is possible to prevent the battery case from coming into contact with the lid section or the bottom section of the water tank portion.

According to the marine vessel (g) described above, by the control portion controlling the supply discharge portion and adjusting the amount of seawater stored in the water tank portion, the height of the water surface in the water tank portion is controlled, and in response to the shake of the hull or the like, it is possible to control the height position in the water tank of the battery case that floats in a floating state and prevent the battery case from coming into contact with the lid section or the bottom section of the water tank portion.

According to the marine vessel (h) described above, by closing the opening portion using the lid portion, it is possible to prevent the stored water from coming out from the water tank portion to the deck due to the shake of the hull. Further, by closing the opening portion using the lid portion, it is possible to prevent an article on the deck from coming into contact with and breaking the battery case stored in the water tank portion. Thereby, it is possible to protect the detachable portable battery required for navigation of the marine vessel and prevent the marine vessel from being unable to navigate on its own at sea.

According to the marine vessel (i) described above, by arranging the battery case in the existing water tank portion for storing a marine organism, it becomes possible to use an existing space in the hull and store a spare battery case. Alternatively, it is possible to remove the battery case and store the marine organism in the existing water tank portion. Alternatively, on the way of navigation, it is also possible to use the water tank portion by switching articles that are stored in the water tank portion.

According to the marine vessel (j) described above, it is possible to switch between a state in which the battery case is stored in the existing water tank portion for storing a marine organism and a spare battery case is stored by using an existing space in the hull, and a state in which the battery case is removed from the water tank portion and a marine organism is stored in the existing water tank portion. Further, it is also possible to perform the switching on the way of navigation.

Effects of the Invention

According to the aspect of the present invention, it is possible to achieve an effect of providing a marine vessel capable of mitigating an impact on the battery and improving a weight balance stability.

EMBODIMENTS

Hereinafter, a first embodiment of a marine vessel according to the present invention will be described with reference to the drawings.

Figure 1:
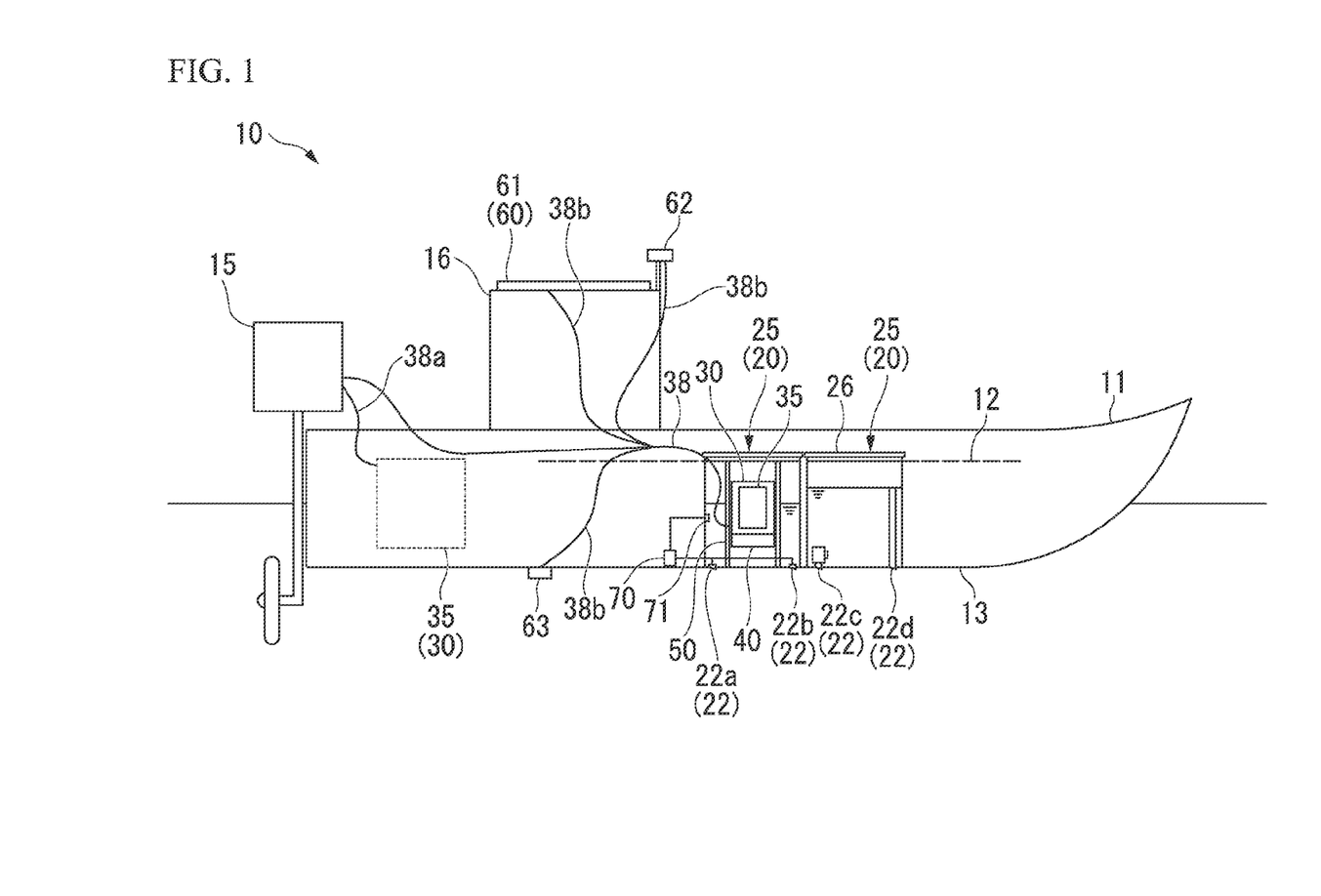
FIG. 1 is a schematic side view showing a first embodiment of a marine vessel according to the present invention.

FIG. 1 is a schematic side view showing the marine vessel in the present embodiment. In the drawing, reference numeral 10 indicates the marine vessel.

The marine vessel 10 according to the present embodiment includes, as shown in FIG. 1, a hull 11, an electric propulsion portion 15, a water tank portion 20, a battery case 30, and a detachable portable battery 35 that is stored in the battery case 30.

The electric propulsion portion 15 is attached to the hull 11.

The electric propulsion portion 15 propels the hull 11. The electric propulsion portion 15 includes an electric machine such as a motor and is provided on the hull 11. The electric propulsion portion 15 is driven by the detachable portable battery 35 as an electric power source that is provided on the hull 11. The hull 11 can advance and retreat by the driving of the electric propulsion portion 15. The electric propulsion portion 15 is an outboard engine in the present embodiment but is not limited to this configuration.

The water tank portion 20 capable of storing water therein is provided on the hull 11. The water tank portion 20 is a live-box. The water tank portion 20 can take in, for example, seawater from the outside of the hull 11 and store the seawater therein. The water tank portion 20 has a height equal to a height from a vessel bottom 13 to the deck 12. The water tank portion 20 includes an opening portion 25 that opens at the deck 12. The water tank portion 20 includes a lid portion 26 that opens and closes the opening portion 25. When the opening portion 25 is closed by the lid portion 26, the inside of the water tank portion 20 is hidden from the deck 12. Further, when the opening portion 25 is opened by the lid portion 26, the detachable portable battery 35 can be removed and stored from the inside of the water tank portion 20 and from the deck 12 as described below.

In the present embodiment, the water tank portion 20 has the same horizontal cross-sectional contour from the vessel bottom 13 to the deck 12. A plurality of water tank portions 20 can be arranged on the hull 11. All of the plurality of water tank portions 20 have the same shape in a top view. The shape in a top view of the water tank portion 20 is not limited to this configuration, and the plurality of water tank portions 20 can have a different shape.

A bottom section of the water tank portion 20 may coincide with the vessel bottom 13. The bottom section of the water tank portion 20 may be formed as a double bottom that is close to the deck 12 in the hull 11 with respect to the vessel bottom 13.

A supply discharge portion (scupper) 22 as a water level adjustment mechanism is provided on the bottom section of the water tank portion 20. The scupper 22 passes through the vessel bottom 13 and is capable of exchanging seawater between the outside of the vessel and the inside of the water tank portion 20. The scupper 22 includes a water supply portion 22a and a water supply portion 22c that are capable of supplying water from the outside of the vessel to the inside of the water tank portion 20 and a water discharge portion 22b and a water supply portion 22d that are capable of discharging water from the inside of the water tank portion 20 to the outside of the vessel.

For example, the water supply portion 22a and the water discharge portion 22b cause one water tank portion 20 to be capable of communicating with the outside of the vessel. The water supply portion 22c and the water discharge portion 22d cause another water tank portion 20 to be capable of communicating with the outside of the vessel. A bilge pump is attached to the water supply portion 22c and is capable of supplying water from the outside of the vessel to the inside of the water tank portion 20. A scupper pipe is connected to the water discharge portion 22d, and the water level stored in the other water tank portion 20 can be higher than the water level outside the vessel.

The water supply portion 22a, the water supply portion 22c, the water discharge portion 22b, and the water discharge portion 22d can be appropriately selected and formed on a predetermined water tank portion 20.

Figure 2:
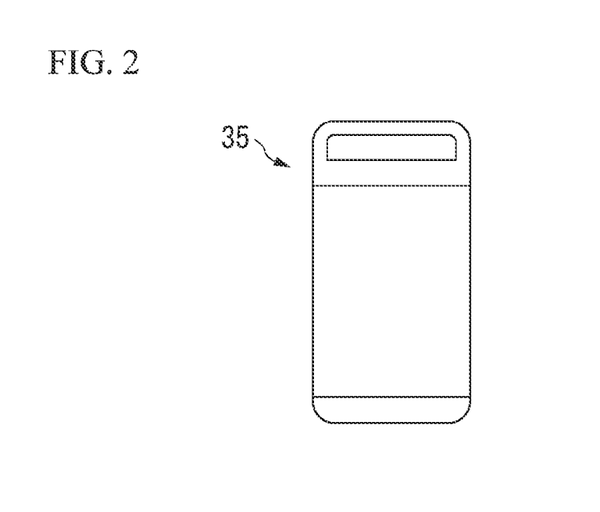
FIG. 2 is a schematic front view showing a detachable portable battery in the first embodiment of the marine vessel according to the present invention.

FIG. 2 is a schematic front view showing a detachable portable battery provided on the marine vessel in the present embodiment.

The detachable portable battery 35 which is the electric power source of the electric propulsion portion 15 is stored within the water tank portion 20.

The detachable portable battery 35 is, as shown in FIG. 2, a battery pack that can be simply removed and replaced, that is, a detachable portable secondary battery. The detachable portable battery 35 can carry electricity in small quantity and can be used by replacement instead of charging. The detachable portable battery 35 can be expanded to various applications such as electric mobility on land, a stationary battery at home that is not limited to mobility, an outdoor portable electric power source, or the like and can structure a battery-shared system network. The detachable portable battery 35 has a feature of a mobile power pack that is replaced with another fully charged battery when a remaining battery amount is decreased.

Figure 3:
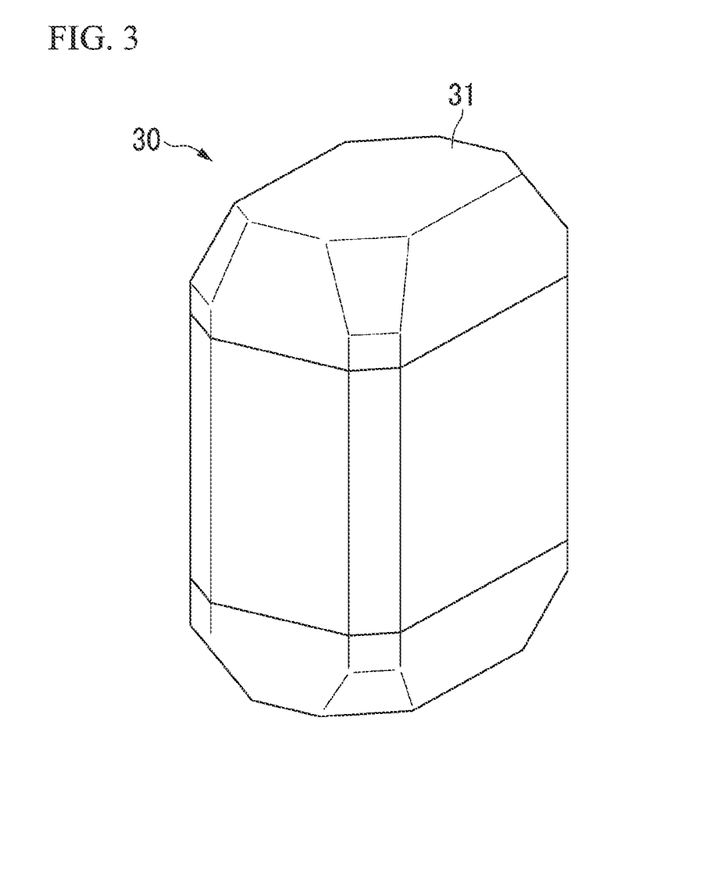
FIG. 3 is a schematic perspective view showing a battery case in the first embodiment of the marine vessel according to the present invention.

FIG. 3 is a schematic perspective view showing the battery case provided on the marine vessel according in the present embodiment.

The detachable portable battery 35 can be stored in the battery case 30. As shown in FIG. 3, the battery case 30 can hermetically store a plurality of detachable portable batteries 35. The battery case 30 has a lid portion which is able to be opened and closed on one end 31. A storage recess portion in which the detachable portable battery 35 is stored within the battery case 30 is exposed when the lid portion is opened. The battery case 30 is hermetically closed by closing the lid portion after the detachable portable battery 35 is inserted in the storage recess portion. That is, the one end 31 indicates a position where the detachable portable battery 35 is inserted into or removed from the battery case 30 and a direction in which the detachable portable battery 35 is inserted or removed.

The battery case 30 includes a cable 38 that is connected to the electric propulsion portion 15.

By supplying electric power to the electric propulsion portion 15 via the cable 38 from the detachable portable battery 35 stored in the battery case 30, the electric propulsion portion 15 can be driven, and the hull 11 can advance and retreat.

The battery case 30 can charge the stored detachable portable battery 35 using electric power supplied from a charging portion 60 described later.

A plurality of detachable portable batteries 35 stored in the battery case 30 can be also provided on the hull 11 other than the inside of the water tank portion 20. The battery case 30 arranged at a position other than the inside of the water tank portion 20 includes a cable 38a that is connected to the electric propulsion portion 15. In this case, the detachable portable battery 35 stored in the water tank portion 20 can also be a replacement battery when the battery is out of charge.

Further, the battery case 30 that is stored within the water tank portion 20 may include a cable 38b that is connected to the charging portion 60. The charging portion 60 may have a configuration that generates electricity by a renewable energy source. The charging portion 60 has an electric circuit or the like required for charging the detachable portable battery 35 using the generated electric power. The charging portion 60 can be a solar power generation portion 61 that is provided on a wheelhouse 16 or the deck 12. Alternatively, the charging portion 60 can also be a wind force power generation portion 62 that is provided on the wheelhouse 16 or the deck 12.

Further, the charging portion 60 can be also a tidal power generation portion 63 that is provided outside the vessel bottom 13. The charging portions 60 can also be connected to the battery case 30 that is arranged at a position other than the inside of the water tank portion 20 by a cable. Further, a configuration may be employed in which the battery case 30 is connected to the charging portion 60 and the electric propulsion portion 15 that are switched.

When the detachable portable battery 35 stored in the battery case 30 of the water tank portion 20 is charged by the charging portion 60, and the charge amount of the detachable portable battery 35 stored in the battery case 30 at a position other than the inside of the water tank portion 20 is reduced, these batteries can be exchanged. Thereby, even when the charge amount of the detachable portable battery 35 that is supplying electric power to the electric propulsion portion 15 as an electric power source during navigation of the marine vessel 10 is decreased, it is possible to maintain the electric power supplied to the electric propulsion portion 15 by the exchange of the detachable portable battery 35 and continue the navigation of the marine vessel 10.

Figure 4:
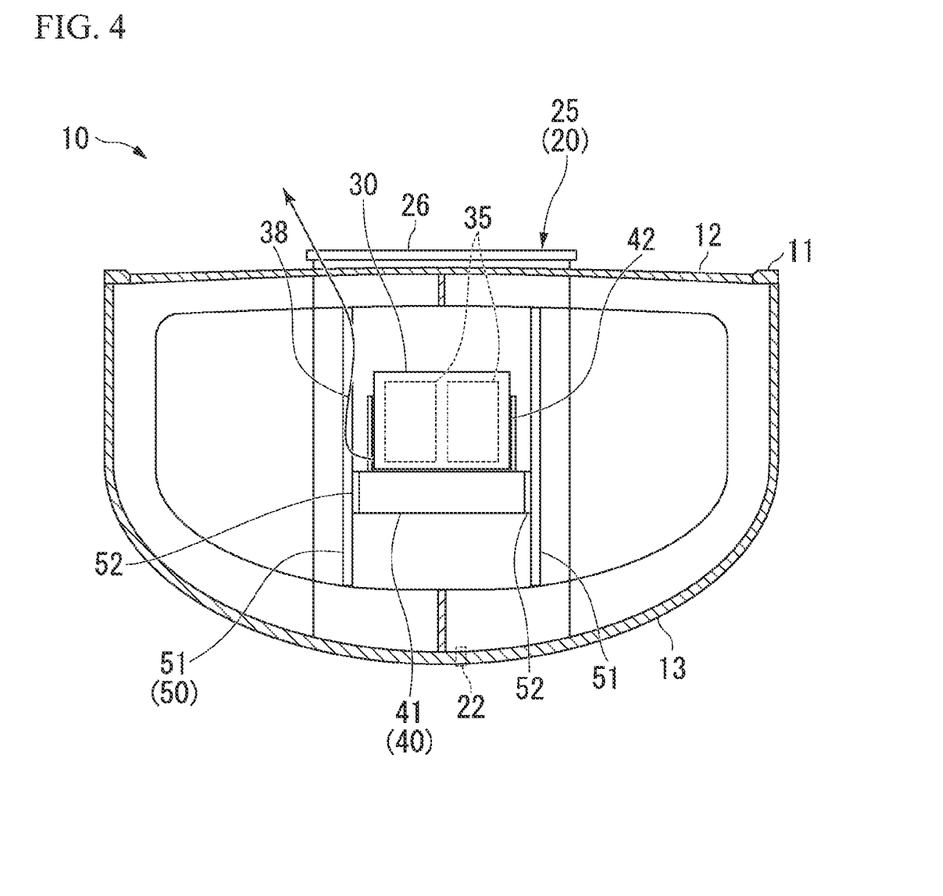
FIG. 4 is a schematic cross-sectional view showing the first embodiment of the marine vessel according to the present invention.

FIG. 4 is a schematic cross-sectional view showing the marine vessel in the present embodiment.

The battery case 30 is provided within the water tank portion 20 so as to be movable upward and downward.

A float portion 40 and a vertical motion regulation portion 50 are provided within the water tank portion 20.

The battery case 30 is arranged on the float portion 40. The float portion 40 is provided within the water tank portion 20 so as to be movable upward and downward. The movement in an upward-downward direction of the float portion 40 is regulated by the vertical motion regulation portion 50.

The vertical motion regulation portion 50 includes a movement regulation rail 51 that extends in the upward-downward direction and a vertical movement section 52 that regulates the movement of the float portion 40 along the movement regulation rail 51 as shown in FIG. 4. The movement regulation rail 51 is attached to the inside of the water tank portion 20. A plurality of movement regulation rails 51 are arranged within the water tank portion 20. All of the plurality of movement regulation rails 51 extend in the vertical direction. The movement regulation rails 51 are arranged in parallel with each other. The movement regulation rails 51 are arranged to be spaced from each other in the horizontal direction.

The vertical movement section 52 that is movable in a direction in which the movement regulation rail 51 extends is attached to the movement regulation rail 51. The vertical movement section 52 is attached to all of the movement regulation rails 51. The vertical movement section 52 is attached to the float portion 40. The vertical movement section 52 is attached to the float portion 40 at a circumferential edge position in a plan view. The vertical movement section 52 can be provided at four corners of the float portion 40 in a plan view. Alternatively, the vertical movement section 52 can be provided at a middle of four sides of the float portion 40 in a plan view. By the vertical movement sections 52 simultaneously moving relative to the movement regulation rail 51, the float portion 40 can move in the upward-downward direction.

The float portion 40 has a hollow float box 41 that is hermetically sealed. The float box 41 has a buoyancy force with respect to water stored in the water tank portion 20. The float box 41 is a rigid body and is movable in the upward-downward direction without deforming.

The battery case 30 is attached to the float box 41. The battery case 30 is arranged above the float box 41. The battery case 30 is arranged such that the one end 31 having the lid portion faces upward. The battery case 30 is attached to an upper portion of the float box 41 by an attachment frame 42. The attachment frame 42 is assembled above the float box 41. A lower end of the attachment frame 42 is fixed to the float box 41. The attachment frame 42 extends upward from the float box 41. The battery case 30 is attached to the vicinity of an upper end of the attachment frame 42. The attachment frame 42 is fixed to a side portion of the battery case 30.

It is enough that the battery case 30 be fixed to the attachment frame 42, and a lower portion of the battery case 30 may not be in contact with the float box 41. The lower portion of the battery case 30 can be also in contact with the float box 41.

In a state where the battery case 30 is fixed to the float box 41 via the attachment frame 42, a seal lid portion that is provided on an upper end of the battery case 30 can be opened. When the seal lid portion of the battery case 30 is opened, it is possible to insert the detachable portable battery 35 from the exposed opening into the storage recess portion, and it is possible to set the detachable portable battery 35 to the battery case 30. When the seal lid portion of the battery case 30 is opened, the exposed detachable portable battery 35 can be drawn upward, and it is possible to remove the detachable portable battery 35 from the battery case 30.

The battery case 30 can be also detachable from the attachment frame 42. In this case, the battery case 30 can be removed from the attachment frame 42 and be replaced with the battery case 30 arranged at a position other than the inside of the water tank portion 20. In this case, the cable 38 can be also detachable and reconnectable.

In the marine vessel 10 of the present embodiment, the battery case 30 is fixed to the float portion 40. Therefore, when the float portion 40 moves in a direction that is regulated by the movement regulation rail 51, the battery case 30 integrally moves. The battery case 30 is regulated such that the movement direction of the battery case 30 is the upward-downward direction.

When the hull 11 is inclined due to waves or the like, or when the hull 11 is shaken, at the inside of the water tank portion 20, the stored sea water is shaken, and the water surface moves upward and downward. Accordingly, the float box 41 moves upward and downward along the movement regulation rail 51. Thereby, the battery case 30 that moves integrally with the float box 41 moves upward and downward without hitting the rest of the hull 11. Thereby, even when the center of gravity of the battery case 30 moves, an impact does not act on the battery case 30.

Thereby, it is possible to mitigate an impact on the battery case 30 caused by the shake of the hull 11, and it is possible to reduce an impact on the detachable portable battery 35 stored in the battery case 30.

In the marine vessel 10 of the present embodiment, the amount of seawater that is stored in the water tank portion 20 is adjusted by the supply discharge portion (scupper) 22, and thereby, it is possible to adjust the height position of the float box 41 in the water tank portion 20.

A sensor 71 that is provided on the water tank portion 20 and detects the surface height of stored water and a control portion 70 that controls an operation of the supply discharge portion (scupper) 22 are provided. The sensor 71 is connected to the control unit.

By driving the supply discharge portion (scupper) 22 by the control portion 70 to which the water surface height detected by the sensor 71 is input, the amount of seawater that is stored in the water tank portion 20 can be adjusted to be small, for example, when the shake of the hull 11 by waves is large or the like. Thereby, it is possible to prevent the battery case 30 from hitting the lid portion 26 in accordance with the upward-downward movement of the float box 41 along the movement regulation rail 51.

Similarly, when the shake of the hull 11 by waves is large or the like, by adjusting the amount of seawater that is stored in the water tank portion 20 to be large, it is possible to prevent the battery case 30 from hitting a bottom section of the water tank portion 20 in accordance with the upward-downward movement of the float box 41 along the movement regulation rail 51.

In the present embodiment, since the battery case 30 that stores the detachable portable battery 35 is stored in a floating state in the seawater stored in the water tank portion 20, it is possible to reduce the weight of the hull 11 at the time of navigation compared to the case where the detachable portable battery 35 is arranged to be directly fixed to the hull 11. Thereby, a cruising distance can be extended even in the marine vessel in which detachable portable batteries 35 of the same number is loaded, that is, in the marine vessel for which the same amount of electric power for navigation is prepared. Further, since charging for a spare detachable portable battery 35 can be always performed by the charging portion 60, it is possible to further extend the cruising distance.

In the present embodiment, a battery case 30 that stores a detachable portable battery 35 can be provided in one water tank portion 20, and a battery case 30 that stores a detachable portable battery 35 can be provided in another water tank portion 20. At the same time, a marine organism which is an outcome of fishing is put in the stored seawater, and the water tank portion 20 can be also used as a live-box. Further, in this case, the battery case 30, the float box 41, and the vertical movement section 52 are removed, and the water tank portion 20 can be also used only as a live-box. Here, a configuration can be employed in which the movement regulation rail 51 is not removed, and the vertical movement section 52 can be easily removed from the movement regulation rail 51.

Alternatively, a battery case 30 that stores a detachable portable battery 35 can be provided in one water tank portion 20, and a battery case 30 that stores a detachable portable battery 35 cannot not be provided in another water tank portion 20.

Further, it is also possible to switch whether or not the battery case 30 that stores the detachable portable battery 35 is provided in the water tank portion 20 during navigation. That is, when the outcome of fishing is large, the battery case 30 that has been stored in the water tank portion 20 can be removed, and a marine organism that is the outcome of fishing or the like is stored. Alternatively, when the outcome of fishing is small, for example, the battery case 30 that has been placed on the deck can be stored in the water tank portion 20.

Hereinafter, a second embodiment of a marine vessel according to the present invention will be described with reference to the drawings.

Figure 5:
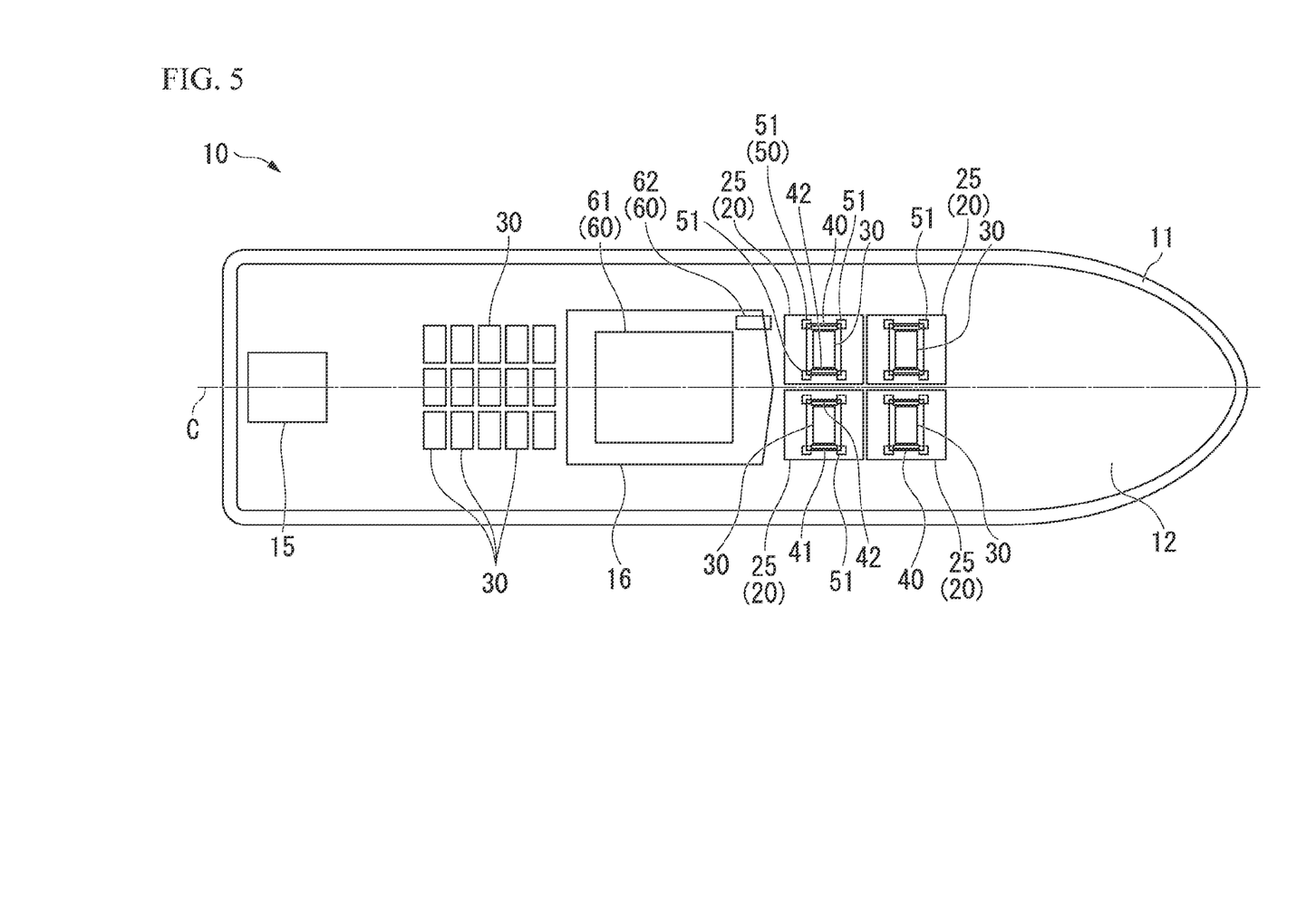
FIG. 5 is a schematic top view showing a second embodiment of a marine vessel according to the present invention.

FIG. 5 is a top view showing the marine vessel in the present embodiment. The present embodiment is distinguished from the first embodiment described above in an arrangement of the water tank portion 20. Other configurations corresponding to the first embodiment described above are designated by the same reference numerals, and description thereof is omitted.

The marine vessel 10 in the present embodiment includes four water tank portions 20 as shown in FIG. 5. Two water tank portions 20 among the four water tank portions 20 are arranged in a line-symmetric manner with respect to a hull center line C in the hull 11. Further, the four water tank portions 20 are located near the middle of the entire length in the forward-rearward direction of the hull 11. The four water tank portions 20 of the present embodiment are located close to the wheelhouse 16 at a further forward position than the wheelhouse 16; however, the arrangement is not limited thereto. Any of the water tank portions 20 may be located at a further rearward position than the wheelhouse 16. Further, as the arrangement of the water tank portion 20, the water tank portion 20 can be provided at a position close to a broadside as long as the water tank portions 20 are arranged in a line-symmetric manner with respect to the hull center line C.

One battery case 30 is stored in each of the four water tank portions 20. All of the water tank portions 20 have a rectangular contour in a top view. One float box 41 is stored in each of the four water tank portions 20. The float box 41 has a rectangular contour in a top view. One float box 41 is supported by four movement regulation rails 51. The four movement regulation rails 51 are located at four corners of the float box 41.

The attachment frame 42 is fixed to each of end portions of the float box 41 in a width direction of the hull 11. A frame which is an upper end of the attachment frame 42 extends in the forward-rearward direction. The battery case 30 is arranged between the two attachment frames 42. Two detachable portable batteries 35 are stored in the battery case 30 so as to be aligned in the width direction of the hull 11.

The four battery cases 30 are arranged at line-symmetric positions with respect to the hull center line C. Further, the four battery cases 30 are arranged in the vicinity of the middle of the hull 11 in the forward-rearward direction. Thereby, the stability of a trim and a heel of the hull 11 is improved.

A number of battery cases 30 are loaded on the hull 11 at a further rearward position than the wheelhouse 16. The battery case 30 at the further rearward position than the wheelhouse 16 supplies required electric power to the electric propulsion portion 15 at the time of normal navigation of the marine vessel 10. In the number of battery cases 30, the supply electric power is controlled such that the charge amount is reduced in a predetermined order. When the charge amount is reduced at the detachable portable battery 35 stored in the battery case 30 at the further rearward position than the wheelhouse 16, the stored detachable portable battery 35 is removed from the battery cases 30 that are stored in the four water tank portions 20 and is replaced. In the battery cases 30 stored in the four water tank portions 20, the stored detachable portable battery 35 is charged by electric power from the charging portion 60. Thereby, when the battery level is low, by replacing the battery with a new mobile power pack, it is possible to continue navigation without waiting for charging.

Since the water tank portion 20 of the present embodiment is divided into four parts, the shake of water stored in one water tank portion 20 can be reduced, and the change of the water level can be reduced. Thereby, it is possible to reduce an impact on the battery case 30. Further, by using a configuration in which only one battery case 30 is stored in one water tank portion 20, the battery cases 30 do not hit each other in the same water tank portion 20.

In the present embodiment, effects similar to those of the embodiment described above can be achieved.

Further, in the present invention, individual configurations in each of the embodiments described above can also be individually selected and implemented in combination.

The above embodiments are described using a configuration in which the battery case 30 is placed on the float box 41; however, it is also possible to give a buoyancy force to the battery case 30 itself and store the battery case 30 within the water tank portion 20 so as to be movable upward and downward by the vertical motion regulation portion 50.

Alternatively, the battery case 30 can be stored in a portion other than the water tank portion 20 in the hull 11 such as, for example, a ballast tank, a bilge tank, or a trim tank. In this case, it is preferable that the vertical motion regulation portion 50 be provided also in the ballast tank, the bilge tank, or the trim tank, and the battery case 30 be stored to be movable upward and downward. At this time, a water level adjustment mechanism equivalent to the scupper 22 can be also provided.

DESCRIPTION OF REFERENCE NUMERALS

10 Marine vessel
11 Hull
12 Deck
15 Electric propulsion portion
20 Water tank portion
22, 22a to 22d Supply discharge portion (scupper)
25 Opening portion
26 Lid portion
30 Battery case
35 Detachable portable battery
38, 38a, 38b Cable
40 Float portion
41 Float box
42 Attachment frame
50 Vertical motion regulation portion
51 Movement regulation rail
52 Vertical movement section
60 Charging portion
70 Control portion
71 Sensor

What is claimed is:

1. A marine vessel comprising:
a hull;
an electric propulsion portion that propels the hull;
a water tank portion that is provided on the hull and is capable of storing water in the water tank portion;
a float portion that is provided within the water tank portion so as to be movable upward and downward; and
a battery case that is attached to the float portion and is capable of storing a detachable portable battery which becomes an electric power source of the electric propulsion portion in the battery case,
wherein the battery case is arranged so as to float with respect to the water in the water tank portion.

2. The marine vessel according to claim 1, comprising:
a cable that connects the battery case to the electric propulsion portion.

3. The marine vessel according to claim 1,
wherein the battery case is capable of hermetically storing a plurality of detachable portable batteries.

4. The marine vessel according to claim 1, comprising:
within the water tank portion, a vertical motion regulation portion that regulates a movement of the float portion in an upward-downward direction.

5. The marine vessel according to claim 1,
wherein the water tank portion comprises a supply discharge portion that takes water in and out between an inside of the water tank portion and an outside of the hull.

6. The marine vessel according to claim 5,
wherein in the water tank portion, a height position of the battery case in the water tank portion is adjusted by adjusting an amount of seawater that is stored by the supply discharge portion.

7. The marine vessel according to claim 6, comprising:
a sensor that detects the amount of seawater that is stored in the water tank portion; and
a control portion that controls the supply discharge portion based on a detection result from the sensor and adjusts the amount of seawater that is stored in the water tank portion.

8. The marine vessel according to claim 1,
wherein the water tank portion comprises a lid portion that is capable of opening and closing an opening portion which opens at a deck of the hull.

9. The marine vessel according to claim 1, comprising:
a water tank portion that includes the battery case in the water tank portion; and a water tank portion that does not include the battery case.

10. The marine vessel according to claim 1,
wherein the battery case is detachable from the water tank portion.

* * * * *